Patented Feb. 21, 1928.

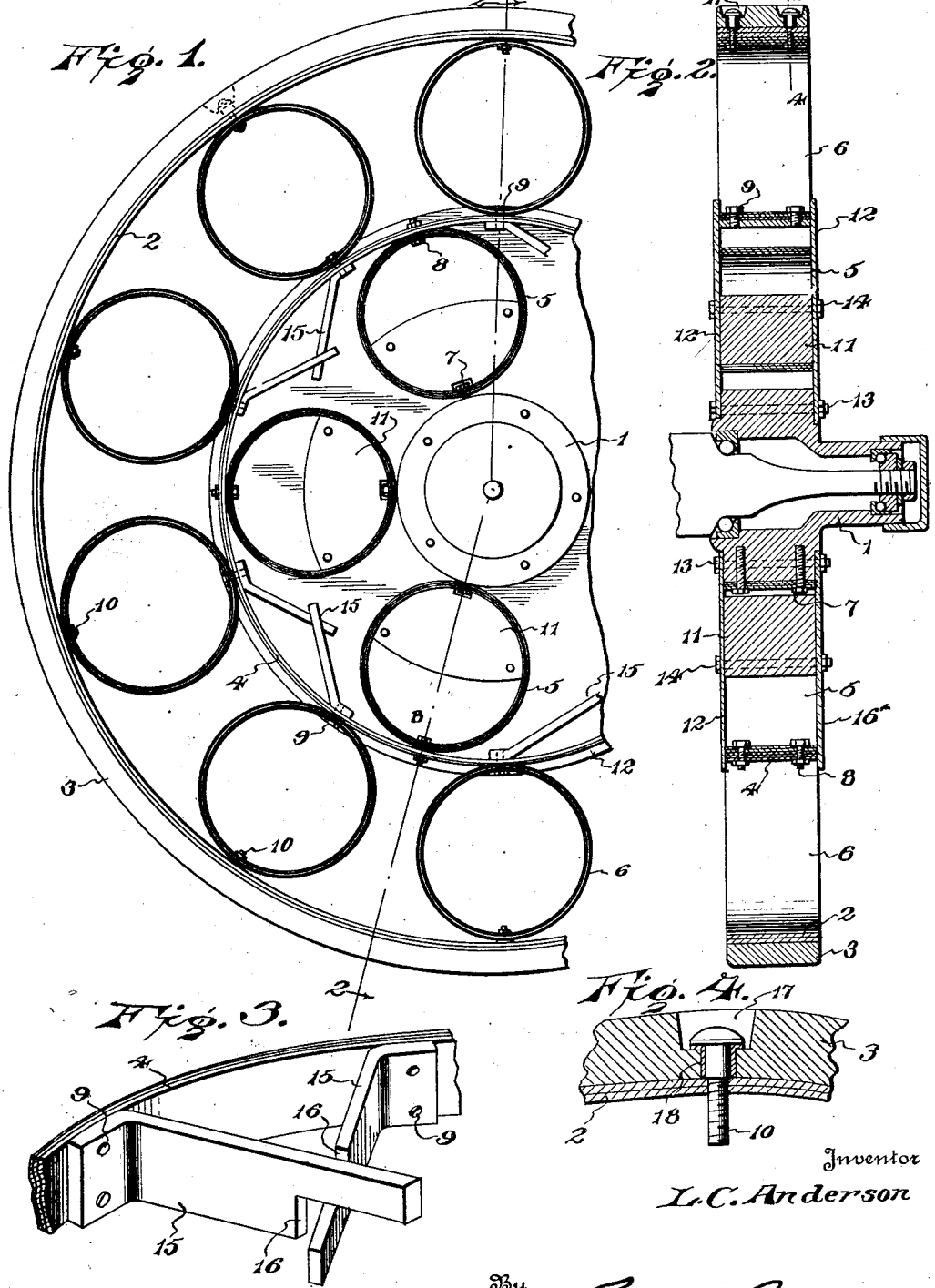

1,659,938

UNITED STATES PATENT OFFICE.

LLOYD C. ANDERSON, OF MINNEAPOLIS, MINNESOTA.

SPRING WHEEL.

Application filed March 23, 1927. Serial No. 177,764.

The invention has relation to vehicle wheels and aims to provide an article, particularly adapted for pleasure cars, which will insure ease and comfort to the occupant of the vehicle, and which will absorb shocks and vibration in substantially the same manner as wheels equipped with pneumatic tires, but which is free from the objectionable features of pneumatic tires since it is proof against puncture and free from blow outs and rim cuts.

The invention provides a vehicle wheel having the rim yieldably connected to the hub in a manner to compensate for shock and vibration, and which yields under the load stresses in substantially the same manner as wheels equipped with pneumatic tires.

While the drawings illustrate a preferred embodiment of the invention, it is to be understood that in adapting the means to meet specific needs and requirements the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a side view of approximately one-half of a spring wheel embodying the invention, the plate on the near side being omitted.

Figure 2 is a transverse sectional view of the complete wheel on the line 2—2 of Figure 1, looking in the direction of the arrows.

Figure 3 is a detail perspective view of a portion of the intermediate ring showing the lateral braces.

Figure 4 is an enlarged, detail sectional view on the line 4—4 of Figure 2.

Corresponding and like parts are referred to in the following description and designated in the several views of the drawings by like reference characters.

The wheel comprises a hub 1 and a rim 2, to which is fitted a soft tread tire 3, such as rubber. An intermediate ring 4 is disposed between the hub 1 and rim 2 and spring elements 5 and 6 connect said ring with the hub and rim. The spring elements 5 and 6 are of similar or like formation, each being of circular outline and formed of a spring metal strip or ribbon wound upon itself. The ring 4 and the rim 2 are preferably formed in a like manner, so as to possess a certain degree of resiliency to supplement the action of the spring elements 5 and 6. The spring elements 5 are grouped about the hub 1 and are secured thereto by machine screws 7 or other suitable fastening means. Bolts 8 or analogous fastenings connect the spring elements 5 to the ring 4. The spring elements 6 are staggered with relation to the spring elements 5 and are bolted or otherwise secured to the ring 4 and rim 2. Bolts 9 connect the spring elements 6 to the ring 4 and bolts 10 connect said spring element 6 to the rim 2.

Filler blocks 11 are disposed within the spring elements 5 and occupy one-half of the inner portion of each and function as reinforcing and staying means. The inner portion of the filler block is recessed to accommodate the head of the fastenings 7. The filler blocks 11 are preferably of wood although any suitable material may be employed.

Metal disks 12 are disposed upon opposite sides of the wheel and are bolted to the hub, as indicated at 13, and are bolted to each other, as indicated at 14. The bolts 14 pass through the filler blocks 11 and clamp the same between the side plates 12. The diameter of the side plates 12 is slightly greater than the diameter of the ring 4 and in consequence, the outer marginal portions of the plates 12 project beyond the ring 4, as indicated most clearly in Figures 1 and 2. The spring elements 5 and 6 are a trifle less in width than the filler blocks to obviate binding thereof between the side plates in the yielding action of the wheel to compensate for shocks and vibration and the constant changing of the load pressure. The side plates 12 serve to brace and reinforce the wheel against lateral stresses. Pairs of braces 15 are disposed between the spring elements 5 and are made fast at their outer ends to the ring 4. The braces 15 are connected at their outer ends to the ring 4 by the same fastening means 9 provided for connecting the spring elements 6 to the said ring, thereby resulting in an economy of construction and assembly. The braces 15 of each pair are reversely inclined, and their inner ends cross and overlap, as shown most clearly in Figure 3. The inner crossing or overlapping ends of the braces 15 are halved, and the shoulders 16 formed at the inner ends of the cut away portions provide stops to limit any circumferential movement of the outer portion of the wheel represented by the spring elements 6 and the rim 2.

The soft tread tire 3 is formed in its tread portion with depressions 17 to accommodate the heads of the bolts 10 and to prevent said bolts from coming through the tire flanged bushings 18 are set in the portions opposite the depressions 17, as shown most clearly in Figure 4.

Having thus described the invention, I claim:

1. A spring wheel comprising a hub, a rim, a ring intermediate the hub and rim, spring elements between the hub and ring, other spring elements between the ring and rim, and staggered relatively to the first mentioned spring elements, and pairs of braces disposed between the inner spring elements and attached to the said ring.

2. A spring wheel comprising a hub, a rim, a ring intermediate the hub and rim, spring elements between the hub and ring, other spring elements between the ring and rim, and staggered relatively to the first mentioned spring elements, and pairs of braces disposed between the inner spring elements and attached to the said ring, the braces of each pair being reversely inclined and having their inner ends halved and crossed, the shoulders formed at the inner ends of the cut away portions providing stops.

3. A spring wheel comprising a hub, a rim, an intermediate ring, spring elements between the ring and rim, other spring elements between the hub and ring and connected thereto, and of circular outline, and filler blocks filling the inner portion of the inner spring elements.

4. A spring wheel comprising a hub, a rim, an intermediate ring, spring elements between the ring and the hub and rim, the inner spring elements being of circular outline, plates at opposite sides of the wheel and secured to the hub, and filler blocks disposed within the inner portions of the inner spring elements and clamped between the side plates.

5. A spring wheel comprising a hub, a rim, an intermediate ring, circular spring elements between the ring and the rim and hub and attached to the respective parts, pairs of braces between the inner spring elements and attached at their outer ends to the ring, and having their inner ends halved and crossing, plates at opposite sides of the wheel and attached to the hub and filler blocks within the inner portions of the inner spring elements and clamped between the said side plates.

In testimony whereof I affix my signature.

LLOYD C. ANDERSON. [L. S.]